United States Patent [19]

Bhatia

[11] Patent Number: 5,121,998
[45] Date of Patent: Jun. 16, 1992

[54] BEARING ASSEMBLY CAPABLE OF MONITORING ANGULAR VELOCITY

[75] Inventor: Ravi R. Bhatia, Stark County, Ohio

[73] Assignee: The Timken Company, Canton, Ohio

[21] Appl. No.: 678,144

[22] Filed: Apr. 1, 1991

[51] Int. Cl.⁵ .................................................. F16C 19/38
[52] U.S. Cl. .................................. 384/448; 384/539; 384/585
[58] Field of Search ............... 384/448, 446, 539, 571, 384/585, 589

[56] References Cited

U.S. PATENT DOCUMENTS

| | | |
|---|---|---|
| 2,075,280 | 3/1937 | Green . |
| 4,795,278 | 1/1989 | Hayashi ........................... 384/448 |
| 4,865,468 | 9/1989 | Kato et al. ....................... 384/448 |
| 4,938,612 | 7/1990 | Yamada ........................... 384/446 |
| 5,011,303 | 4/1991 | Caron ............................... 384/446 |

*Primary Examiner*—Lenard A. Footland
*Attorney, Agent, or Firm*—Gravely, Lieder & Woodruff

[57] ABSTRACT

A bearing assembly monitors angular velocity about its axis of rotation. The bearing assembly includes an outer race having a pair of tapered raceways presented inwardly, and two inner races in the form of cones, each having a tapered raceway presented outwardly toward one of the raceways of the outer race. The raceway of each cone lies between a thrust rib and end rib at the ends of the cone and tapers downwardly toward the end rib, all such that an undercut exists at the small end of the raceway where the end rib projects beyond it. The bearing assembly also has tapered rollers organized into two rows which are located between the opposed raceways of the outer race and the two cones. The cones abut at their end ribs, and the end ribs of the two cones carry a target wheel in the space between the two rows of rollers. The target wheel which is monitored by a sensor set into the outer race between its two raceways, has clips which project into the undercuts of the two cones to thereby interlock the target wheel and cones. The rotating target wheel rotates with the cones and causes the sensor to produce an electric signal, the frequency of which reflects the angular velocity of the cones or whatever may be attached to the cones.

17 Claims, 2 Drawing Sheets

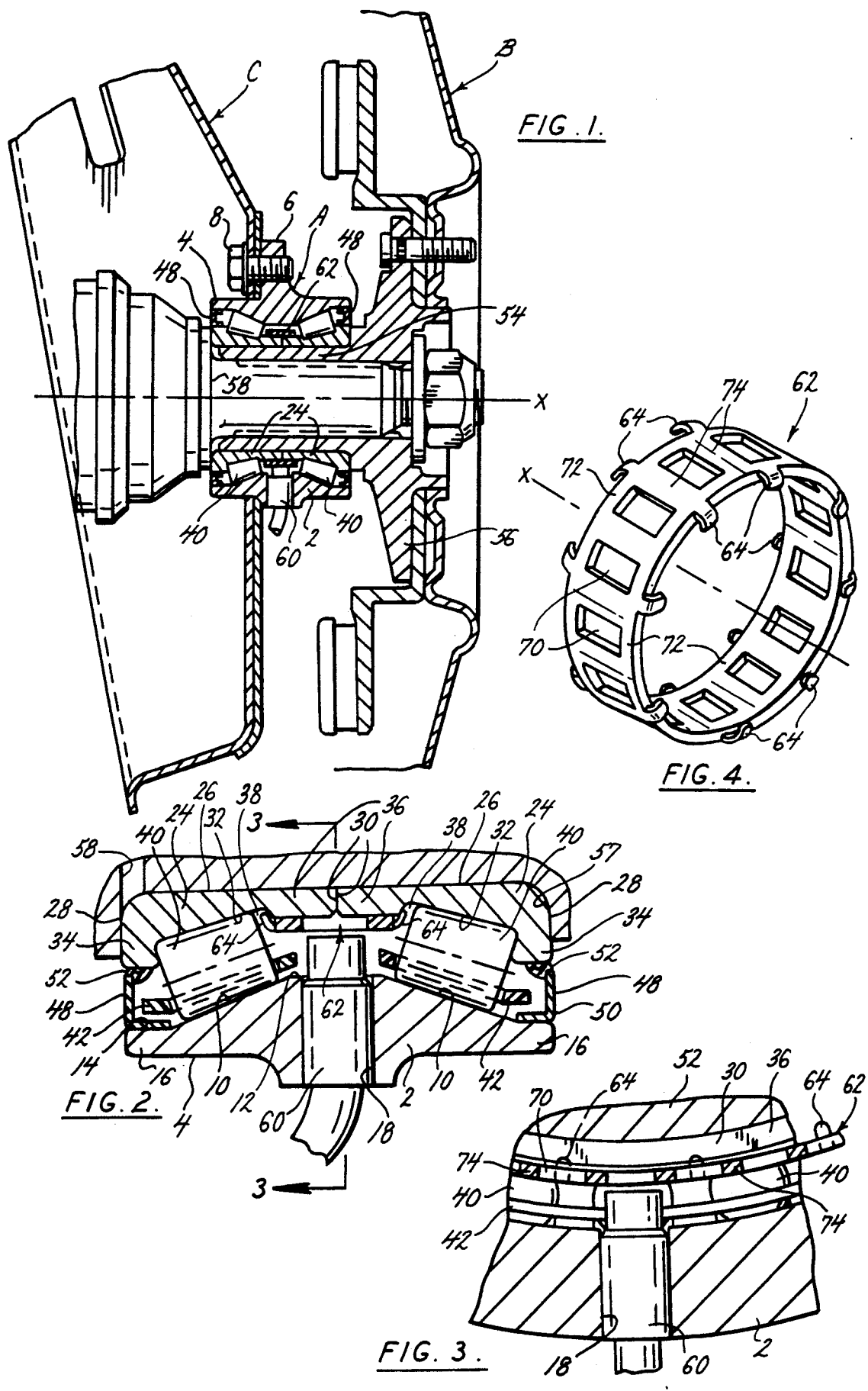

BEARING ASSEMBLY CAPABLE OF MONITORING ANGULAR VELOCITY

BACKGROUND OF THE INVENTION

This invention relates in general to bearings and more particularly to bearing assemblies that are capable of monitoring angular velocity.

The automotive industry has turned to antilock brake systems to improve control over vehicles when the brakes of such vehicles are applied, particularly during emergency stops and braking on slippery surfaces. An antilock brake system must monitor the speed of each wheel to detect whenever a wheel locks up and begins to skid, so that the system may relax the braking effort applied to that wheel, at least to the point that the wheel again begins to rotate. With all wheels rotating, the driver maintains better control over the vehicle.

Typically, the hub for each road wheel carries a target or exciter wheel which rotates with the road wheel at the same angular velocity. As the target wheel turns, its periphery moves past a sensor which is generally fixed in position on the vehicle. The moving target wheel causes the sensor to generate a signal, which may be sinusoidal or simply pulses, but in any event is characterized by a frequency, and that signal along with corresponding signals from all of the other wheels are processed by a controller. Thus, the controller will sense when any one of the wheels locks up or rotates at a diminished velocity. On most automotive vehicles of current manufacture, the target wheels exist on the exterior surfaces of the wheel hubs where they are exposed to contaminants such as dirt and dust, as well as to corrosive chemicals. These substances may damage the target wheel or lodge in the air gap between it and the sensor and perhaps disrupt the sensor.

Some have suggested installing the target wheels within the hub, where they are isolated from foreign substances by the bearing seals, but these efforts have required substantial enlargement of the hubs to accommodate the target wheels.

The present invention resides in a bearing assembly which is quite compact, yet contains a target wheel and sensor that are isolated from exterior conditions by the seals which protect the rolling elements and raceways of the bearing. More specifically, the bearing assembly includes an outer race and two inner races, as well as rolling elements arranged in two rows between the outer race and the two inner races. The Seals close spaces between the ends of the outer race and the two inner races. The sensor fits into the outer race between the two rows of rolling elements. The target wheel fits over and interlocks with the ends of the two inner races.

DESCRIPTION OF DRAWINGS

In the accompanying drawings which form part of the specification and wherein like numerals and letters refer to like parts wherever they occur.

FIG. 1 is a sectional view of a bearing assembly constructed in accordance with and embodying the present invention, with the bearing assembly being fitted to an automotive suspension system and attached to a road wheel;

FIG. 2 is an enlarged partial sectional view of the bearing assembly;

FIG. 3 is a sectional view taken along line 3—3 of FIG. 2;

FIG. 4 is a perspective view of a target wheel forming part of the present invention.

DETAILED DESCRIPTION

Figure 5:
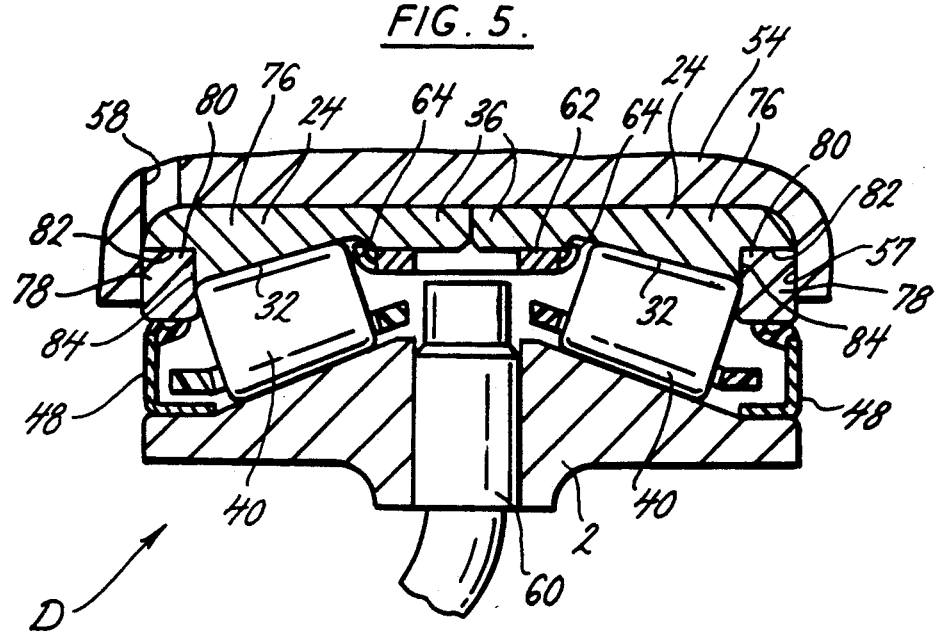
FIG. 5 is a sectional view of a modified bearing assembly.

Referring now to the drawings, a bearing assembly A (FIG. 1) couples a road wheel B to the suspension system of an automotive vehicle, particularly to a component C of the suspension system, such as, a steering knuckle or a trailing pivot arm, and enables the wheel B to rotate about an axis x of rotation, which is, of course, the axis of the bearing assembly A. It may be used with either driven or nondriven wheels, and insofar as the former is concerned, it further serves to couple a drive shaft or drive axle to the road wheel B. It may also be used with either front or rear wheels. Aside from coupling the wheel B to a component C of the suspension system, the bearing assembly A further generates an electrical signal which is responsive to the rotation of the wheel B and indeed, is representative of the angular velocity at which the wheel B revolves about the axis x. This enables a controller in an antilock brake system to monitor the angular velocity of the wheel B.

The bearing assembly A includes an outer race 2 having a cylindrical external surface 4 and several mounting flanges 6 (FIG. 1) which project outwardly from the surface 4 at circumferentially spaced intervals. The cylindrical surface 4 fits into an aperture of equivalent size in the component C of the suspension system, bringing the flanges 6 against the component C, and indeed the outer race 2 is held fast within the component C by bolts 8 which pass through the flanges 6. The outer race 2, which is hollow or tubular, has a pair of tapered raceways 10 (FIG. 2) which face inwardly toward the axis x of rotation and taper downwardly toward an intervening surface 12 located generally midway between the ends of the race 2. Actually, the outer race 2 functions as a double cup of a tapered roller bearing. The raceways 10 lead out to end bores 14 which create annular extensions 16 beyond the raceways 10. The outer race 2 also has a radial bore 18 which opens into the interior of the race 2 through the intervening surface 12. The bore 18 also opens outwardly through the exterior surface and is offset circumferentially with respect to the mounting flanges 6 such that it is located between two of them.

The bearing assembly A also includes a pair of inner races in the form of cones 24 which revolve within the tubular outer race 2 when the wheel B rotates, each being surrounded by a different raceway 10 of the outer race 2 (FIG. 2). Each cone 24 contains a bore 26 which at one end leads out to a back face 28 and at the other end to a front face 30. Indeed, the two cones 24 abut at their front faces 30 within the interior of the outer race 2, causing the back faces 28 to be presented outwardly at the ends of the outer race 2. On its outwardly presented surface, each cone 24 has a tapered raceway 32 which is presented opposite one of the raceways 10 of the outer race 2 and tapers in the same direction, that is, downwardly toward the midregion of the outer race 2. At the large end of its raceway 32 each cone 24 has a thrust rib 34 which projects radially beyond the raceway 32 and extends axially out to the back face 28, which is in fact on the end of the thrust rib 34. The thrust rib 34 revolves within the region of the outer race 2 that is circumscribed by one of the annular extensions 16 on the outer race 2. The tapered raceway 32 tapers downwardly to an end rib 36 which projects radially slightly beyond the small end of the raceway 32, thus creating a slight shoulder or undercut 38 at the small end of the raceway 32. The front face 30 for the cone 24 exists on the end rib 36.

The raceways 10 and 32 of the outer race 2 and cones 24 are thus arranged in pairs, that is to say, opposite each raceway 10 on the outer race 2 a corresponding raceway 32 exists on one of the cones 24 (FIG. 2). In addition to the outer race 2 and the two cones 24, the bearing assembly A has a complement of tapered rollers 40 arranged in two rows, there being a separate row of rollers 40 between each pair of raceways 10 and 32. Indeed, within each row, the tapered side faces of the rollers 40 bear against and roll along the two raceways 10 and 32 for that row, while the large end faces of the rollers 40 bear against the thrust rib 34 at the end of the raceway 32 for that row. But the rollers 40 are slightly shorter than the raceways 32 of the cones 24, so that gaps exist between the small end faces of the rollers 40 and the end ribs 36, and indeed, those gaps constitute the undercuts 38. Actually, the rollers 40 are confined in cages 42, there being a separate cage 42 for each row. The cages 42 not only maintain the proper spacing between the rollers 40 within the two rows, but they also cooperate with the end ribs 36 to retain the rollers 40 around the cones 24 when the cones 24 are removed from the outer race 2. The cages 42 in effect ride or float on the rollers 40.

The rollers 40 transmit radial loads between the outer race 2 and the cones 24, while reducing friction to a minimum, but the taper of the raceways 10 and 32 converts the transmitted radial forces into relatively small axial forces which urge the rollers 40 toward the ends of the bearing assembly A. The thrust ribs 34 prevent the rollers 40 from being expelled. The rollers 40 are on apex, meaning that within either row, the tapered side faces of all of the rollers 40, if extended to their respective apices, would have those apices located at a common point along the axis x of rotation, and of course the apices for the raceways 10 and 32 of that row would likewise lie at essentially the same point.

The ends of the bearing assembly A are closed by seals 48 (FIG. 2) which fit into the annular spaces between the extensions 16 on the outer race 2 and the thrust ribs 34 on the two cones 24. Each seal 48 includes a metal case 50 which is pressed into the end bore 14 of one of the extensions 16 for the outer race 2 and an elastomeric sealing element 52 which is bonded to the case 50 and establishes a live or dynamic barrier along the cylindrical surface of the thrust rib 34 for the cone 24 at which it is located.

Whereas the outer race 2 fits into and indeed is bolted to a component C of a vehicle suspension system, the cones 24 fit over a spindle 54 having at one end a flange 56 to which the road wheel B is attached and a shoulder 57 located ahead of the flange 56 (FIG. 1). In this regard, the bores 26 for the two cones 24 are such that an interference fit exists between the cones 24 and the spindle 54. Moreover, the cones 24 are clamped between the shoulder 57 and another shoulder 58 at the opposite end of the spindle 54, but not on the spindle 54.

The radial bore 18 between the two raceways 10 of the outer race 2 contains a sensor 60 (FIG. 2 & 3), whereas the end ribs 36 of the two cones 24 carry a target wheel 62 which excites the sensor 60 in the sense that the sensor 60 produces an electrical signal as the target wheel 62 revolves. That signal may be sinusoidal or simply pulses, and its frequency reflects the speed of rotation. The sensor 60 is coupled electrically to a controller which monitors the frequency and compares it with the frequencies of signals generated at other bearing assemblies A on the vehicle.

The target wheel 62 is centered with respect to the abutting front faces 30 of the two cones 24 and as such its peripheral surface is located directly opposite the inner end of the sensor 60. Indeed, only a very slight air gap exists between the two. The wheel 62 fits snugly over the two end ribs 36 of the cones 24 with a slight interference fit so that it does not slip relative to the cones 24 or revolve with runout. Along its ends, the wheel 62 has clips 64 (FIGS. 2 & 3) which are directed axially beyond the end ribs 36 for the cones 24 and inwardly into the undercuts 38 at the small diameter end of the raceways 32. As such, the clips 64 project into the spaces between the small ends of the rollers 40 and the end ribs 36 of the cones 24, and in that sense interlock the target wheel 62 and cones 24. To accommodate installation of the cones 24 into the outer race 2, the clips 64 must be somewhat flexible or resilient. Thus, they will yield while passing over the end ribs 36 and then snap into the undercuts 38 at the ends of the end ribs 36. They are preferably formed from metal, but resilient polymers will also suffice. The clips 64 serve to center the target wheel 62 over the abutting front faces 30 of the two cones 24 and further, by reason of the interlock, serve to hold the two cones 24 together in the absence of the seals 48.

The target wheel 62 may take any one of several forms. For example, it may have radially directed teeth arranged at equal intervals circumferentially around it. It may also be a metal band having perforations 70 (FIG. 4) located in it at equal circumferential intervals, thus forming essentially two rings 72 and bridges 74 between the rings 72. The bridges 74 interact with the sensor 60 much the same as teeth on a toothed target wheel, while the rings 72 serve to anchor the clips 64. The target wheel 62 may also be a simple annulus magnetized to contain alternating north and south poles around its periphery.

A modified bearing assembly D (FIG. 5) is very similar to the bearing assembly A. However, the cones 24 in the bearing assembly D are not unitary, but instead each has a cone body 76 and separate thrust rib 78. The race 32 and end rib 36 are on the cone body 76 which at the large end of the raceway 32 contains a rabbet 80 having a cylindrical surface 82 that possesses a lesser diameter than the large end of the raceway 32 and an end face 84 that extends radially, intersecting the raceway 32 at the largest diameter for the raceway 32. The separate thrust rib 78 fits tightly into the rabbet 80, there being an interference fit between it and the cylindrical surface 82, and it bears against the end face 84. The thrust rib 78 projects radially out of the rabbet 80 and beyond the large end of the raceway 32 to provide a surface against which the rollers 40 bear at their large ends.

The target wheel 62 for the bearing assembly D is essentially the same as the target wheel 62 for the bearing assembly A, but it is preferably manufactured from metal with its clips 64 initially directed axially instead of being turned inwardly. The metal for the clips 64 in the bearing assembly D does not have the resiliency for the metal of the clips 64 in the bearing assembly A, and thus are more malleable.

To assemble the bearing assembly D, the two cone bodies 76, absent their thrust ribs 78, used likewise without their rollers 40 and cages 42 are brought together within the confines of the target wheel 62. Thus, the target wheel 62 fits over the end ribs 36 of the two cone bodies 76 and the front faces 30 of the cones 24 abut within the target wheel 62. At this juncture the malleable clips 64 on the target wheel are subjected to a rolling operation which deforms them inwardly into the undercuts 38 at the small ends of the cone raceways 32 so that the clips 64 lie behind the end ribs 36. The target wheel 62 and its inwardly directed clips 64 now hold the two cones 24 together. The subassembly which is so formed, is fitted into the outer race 2, again in the absence of the thrust ribs 34, rollers 40 and cages 42. At this time, the rollers 40 and cages 42 are fitted into the two annular spaces between the two pairs of raceways 10 and 32, one set of rollers 40 and its cage 42 being inserted from one end and the other set and its cage 42 from the other end. With the rollers 40 and cages 42 in place, the thrust ribs 78 are fitted into the rabbets 80 of their respective cone bodies 76, and thereafter the seals 48 are fitted to the end bores 14 of the outer race.

This completes the bearing assembly D and it may now be installed over the spindle 54 to which the road wheel B is bolted and into the component C of a suspension system. The two cones 24 lie around the spindle 54 where they are clamped between the shoulders 57 and 58. Indeed, the shoulders 57 and 58 also lie behind the thrust ribs 78 and prevent them from separating and drifting out of the rabbets 80 in their respective cone bodies 76.

Since the thrust ribs 78 are in effect clamped in the rabbets 80, they need not be fitted to the cylindrical surface 82 of the rabbets 80 with a friction fit, although a friction fit is preferred.

Figure 6:
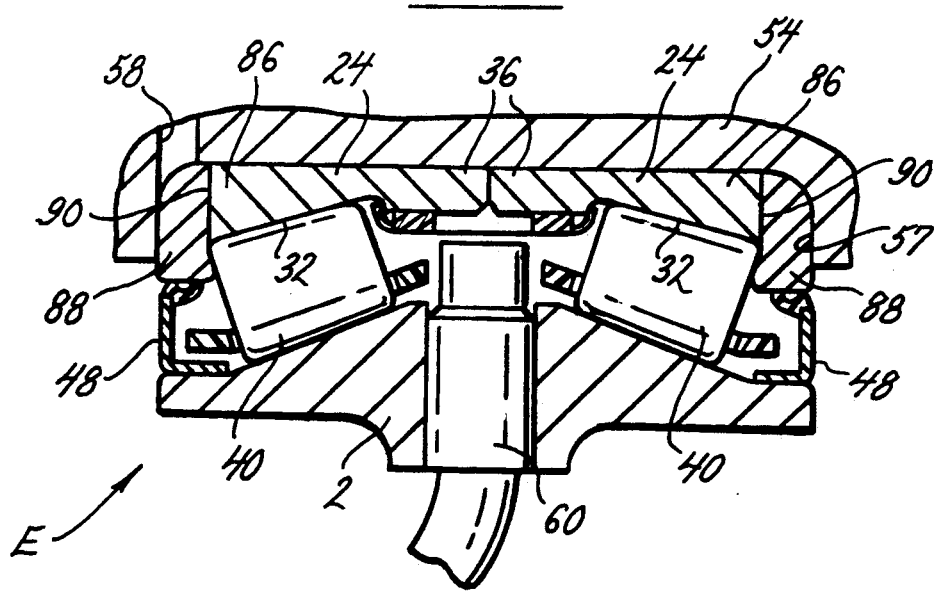
FIG. 6 is a sectional view of another modified bearing assembly.

In another modified bearing assembly E (FIG. 6) the cones 24 are likewise formed from separable components, that is each cone 24 includes a cone body 86 and a thrust rib 88. The cone body 86 terminates at an end face 90 which lies perpendicular to the axis x of rotation, but in contrast to the end face 84 of the cone body 76 for the bearing assembly D, the end face 90 extends between the bore of the cone 24 and the raceway 32 without interruption. It intersects the raceway 32 at the largest diameter of that raceway. The thrust rib 88 abuts the end face 90 and includes part of the bore for the cone 24.

The bearing assembly E is assembled in essentially the same manner as the bearing assembly D and the bearing assembly E is likewise clamped between the shoulders 57 and 58. Thus, the shoulders 57 and 58 serve to hold the thrust ribs 88 against the cone bodies 76 or in other words hold the separable components of the cones 24 together.

This invention is intended to cover all changes and modifications of the example of the invention herein chosen for purposes of the disclosure which do not constitute departures from the spirit and scope of the invention.

What is claimed is:

1. A bearing assembly for facilitating and monitoring rotation about an axis of rotation, said bearing assembly comprising: an outer race having two spaced apart raceways presented inwardly toward the axis of rotation; two inner races located within the outer race, each having a raceway presented outwardly toward a raceway of the outer race; rolling elements arranged in two circular rows between the raceways of the inner and outer races and contacting the raceways, so that they roll along the raceways as relative rotation occurs between the outer and inner races; a sensor mounted on the outer race between the two raceways of the outer race; a target wheel on at least one of the inner races between the two rows of rolling elements, the target wheel being capable of exciting the sensor during relative rotation to produce a signal; and retaining means on the target wheel for engaging the inner races to resist separation of the inner races.

2. A bearing assembly according to claim 1 wherein the sensor during relative rotation produces an electrical signal having a frequency, and the frequency reflects the angular velocity.

3. A bearing assembly according to claim 2 and further comprising seals carried by one of the inner or outer races and establishing a live barrier with the other of the inner or outer races beyond the raceways and rolling elements, whereby the rolling elements are isolated from the surrounding environment.

4. A bearing assembly according to claim 2 wherein the raceways and rolling elements are configured to transfer axial as well as radial loads between the races.

5. A bearing assembly according to claim 4 wherein the inner races abut within the outer race.

6. A bearing assembly according to claim 5 wherein each inner race has an undercut that opens radially outwardly and is spaced from the location where the inner races abut, and the retaining means on the target wheel fit into the undercuts.

7. A bearing assembly according to claim 6 wherein the retaining means are resilient clips which project axially from the target wheel.

8. A bearing assembly according to claim 6 wherein the raceway of each inner race is depressed within the inner race, and the undercut for the race is located along the raceway.

9. A bearing assembly according to claim 4 wherein the inner races have undercuts and the retaining means project into the undercuts.

10. A bearing assembly having the capacity to monitor angular velocity about an axis of rotation, said bearing assembly comprising: a hollow outer race having a pair of tapered raceways presented inwardly toward the axis of rotation and an intervening surface separating the raceways at their smaller ends, whereby the large ends of the raceways are presented toward the ends of the bearing assembly; a pair of cones located within the outer race, with each having a tapered raceway presented outwardly toward a raceway of the outer race, a thrust rib located at and projecting radially beyond the large end of the raceway, and an end rib located at and projecting radially beyond the small end of the raceway, the end ribs of the two cones being presented toward each other; tapered rollers arranged in two rows, there being one row of rollers between the raceway of the one cone and the opposed raceway of the outer race and the other row being between the raceway of the other cone and the opposed raceway of the outer race, the rollers contacting the raceways between which they are located and rolling along those raceways as the cones rotate within the outer race; a sensor mounted in the outer race between the raceways of the outer race; a target wheel fitted over the end ribs of the two cones directly opposite the sensor, the target wheel having the capacity to excite the sensor when the target wheel turns in the outer race with the cones in the sense that the sensor will produce a signal having a frequency, the target wheel having retaining means for engaging the cones to prevent separation of the cones.

11. A bearing assembly according to claim 10 wherein the cones at their end ribs have undercuts, and the retaining means of the target wheel engage and interlock with the cone at the undercut.

12. A bearing assembly according to claim 11 wherein the retaining means are resilient clips which project from the target wheel into the undercuts.

13. A bearing assembly according to claim 11 wherein the ribs of the cones project radially outwardly beyond the raceways of the cones; wherein the tapered rollers are shorter then the distances between the thrust and end ribs of the cones; and wherein the undercuts are along the raceways where the end ribs project from the raceways.

14. A bearing assembly according to claim 10 wherein at least one of the cones has a cone body on which the raceway is located and the thrust rib of the cone is formed as a separate component and mounted on the cone body.

15. A bearing assembly according to claim 14 wherein the cone body includes a rabbet located beyond the large end of its tapered raceway, and the thrust rib fits into the rabbet.

16. A bearing assembly according to claim 15 wherein an interference fit exists between the cone body and the thrust rib.

17. A bearing assembly according to claim 14 wherein the cone body has an end face which intersects the tapered raceway for the cone body at the large end of that raceway, and the thrust rib abuts the end face.

* * * * *